Patented Dec. 14, 1948

2,456,543

UNITED STATES PATENT OFFICE 2,456,543

METHOD OF PREPARING BUTANE-1,2,4-TRICARBOXYLIC ACID

Pliny O. Tawney, Passaic, N. J., assignor to United States Rubber Company, New York, N. Y., a corporation of New Jersey No Drawing. Application March 3, 1948, Serial No. 12,893

1 Claim. (Cl. 260—537)

This invention relates to the preparation of a compound denoted butane-1,2,4-tricarboxylic acid and its preparation.

The chemical is prepared from diethyl alpha-acetyl-alpha-(2-cyanoethyl) succinate.

The following example illustrates the invention.

Example

Eighteen parts of acrylic nitrile are added to a mixture of 64.8 parts of diethyl alpha-acetyl-succinate and 2.25 parts of 50% aqueous potassium hydroxide. The exothermic reaction is allowed to proceed for approximately 20 hours, the temperature being maintained within the range of 30–35° C. by occasional cooling. The reaction mixture in the form of a viscous oil, is diluted with 2 volumes of chloroform and washed successively with several portions each of dilute sulfuric acid and of water. After drying the solution, the choroform is removed by evaporation and the residue is fractionally distilled to yield 49 parts of the liquid diethyl alpha-acetyl-alpha-(2-cyanoethyl) succinate, B 154–90° C.; $n_D^{20}$ 1.4556; sp. g. (20°/20°) 1.1186.

| Analysis | Percent C | Percent H | Percent N |
|---|---|---|---|
| Found | 58.15 | 7.05 | 5.07 |
| Theory | 58.0 | 7.07 | 5.2 |

(a) Sixty-eight parts of diethyl alpha-acetyl-alpha-(2-cyanoethyl) succinate are added in the course of 45 minutes to a stirred solution of 130 parts of potassium hydroxide or other alkali-metal hydroxide in 60 parts of water at 75–80° C. The reaction mixture is then stirred for 1 hour at 75° C. and 1 additional hour at 100° C. After cooling to 25° C., the reaction mixture is neutralized with a solution of 115 parts of concentrated sulfuric acid in 200 parts of water. The resulting mixture is then subjected to continuous extraction with diethyl ether for 48 hours after which the extract is fractionally distilled to remove ether, water and acetic acid, identity of the latter being confirmed by preparation of the p-phenylphenacyl acetate. The residue from the distillation is then recrystallized from ethyl acetate to yield 29.5 parts of butane-1,2-4-tricarboxylic acid, M. 118–120° C.; neutral equivalent, 63.5 (theory, 63.3).

Having thus described my invention, what I claim and desire to protect by Letters Patent is:

A method of preparing butane-1,2,4-tricarboxylic acid which comprises treating diethyl alpha-acetyl-alpha-(2-cyanoethyl) succinate with an alkali-metal hydroxide.

PLINY O. TAWNEY.

No references cited.

Certificate of Correction

Patent No. 2,456,543.  December 14, 1948.

PLINY O. TAWNEY

It is hereby certified that error appears in the printed specification of the above numbered patent requiring correction as follows:

Column 1, line 23, for "154–90° C." read *154–9° C.*;

and that the said Letters Patent should be read with this correction therein that the same may conform to the record of the case in the Patent Office.

Signed and sealed this 5th day of April, A. D. 1949.

[SEAL]

THOMAS F. MURPHY,
*Assistant Commissioner of Patents.*